United States Patent
Ishikawa et al.

(10) Patent No.: US 11,077,982 B2
(45) Date of Patent: Aug. 3, 2021

(54) RESIN CASE

(71) Applicant: TOYOTA JIDOSHA KABUSHIKI KAISHA, Toyota (JP)

(72) Inventors: Shotaro Ishikawa, Yokohama (JP); Yasuhiro Ueno, Miyoshi (JP); Masataka Asai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 16/290,311

(22) Filed: Mar. 1, 2019

(65) Prior Publication Data

US 2019/0270536 A1    Sep. 5, 2019

(30) Foreign Application Priority Data

Mar. 5, 2018 (JP) .............................. JP2018-038442

(51) Int. Cl.
| | |
|---|---|
| *B65D 1/46* | (2006.01) |
| *B65D 65/38* | (2006.01) |
| *B29L 31/00* | (2006.01) |
| *B29K 77/00* | (2006.01) |
| *B29K 709/08* | (2006.01) |
| *B29C 45/14* | (2006.01) |

(52) U.S. Cl.
CPC ............... *B65D 1/46* (2013.01); *B65D 65/38* (2013.01); *B29C 45/1418* (2013.01); *B29K 2077/00* (2013.01); *B29K 2709/08* (2013.01); *B29L 2031/7162* (2013.01)

(58) Field of Classification Search
CPC ...... B65D 1/46; B65D 65/38; B29K 2077/00; B29K 2709/08; B29L 2031/7162; H01M 2/1016; Y02E 60/10; B29C 45/1418
See application file for complete search history.

(56) References Cited

FOREIGN PATENT DOCUMENTS

| JP | 08-264169 A | 10/1996 |
|---|---|---|
| JP | 2013-252772 A | 12/2013 |
| JP | 2014-148124 A | 8/2014 |

*Primary Examiner* — Yan Lan
(74) *Attorney, Agent, or Firm* — Sughrue Mion, PLLC

(57) ABSTRACT

Strength of a resin case is improved. A continuous fiber sheet includes a bottom surface portion which forms a bottom surface of the resin case, an erected wall portion which is erected from the bottom surface portion and forms a peripheral wall of the resin case, and a stepped portion in which the continuous fiber sheet connecting the bottom surface portion and the erected wall portion to each other is bent like steps along the peripheral wall. A resin member includes a rib portion which is bonded to the stepped portion and extends from the stepped portion toward an outer edge of the resin case.

7 Claims, 2 Drawing Sheets

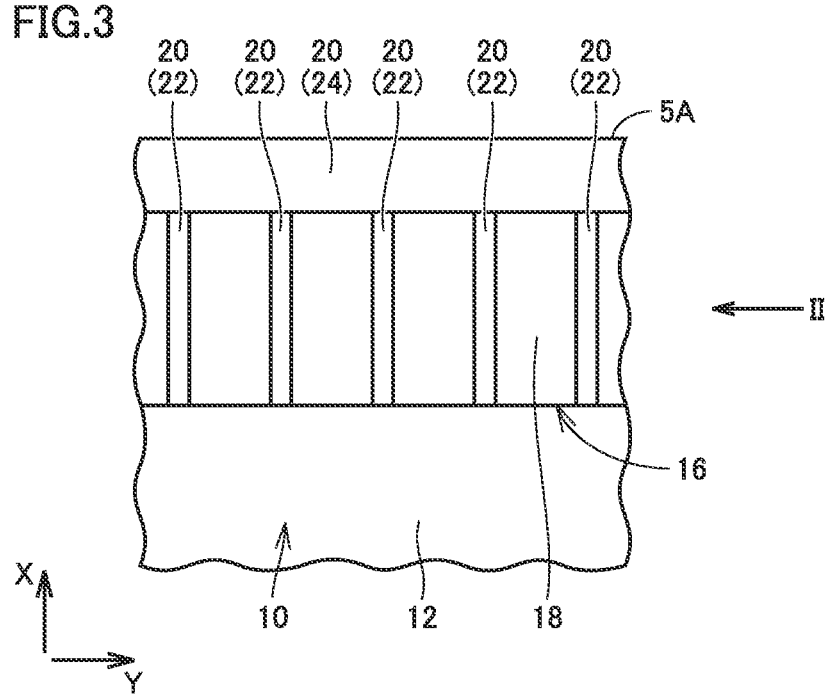
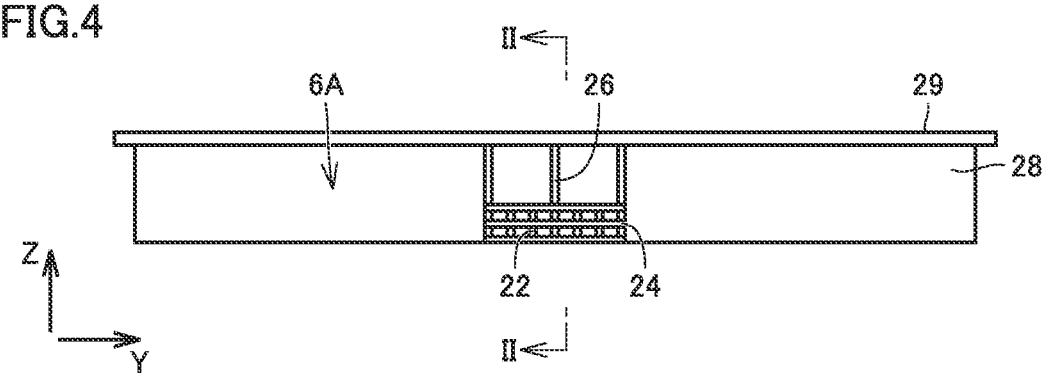

RESIN CASE

This nonprovisional application is based on Japanese Patent Application No. 2018-038442 filed with the Japan Patent Office on Mar. 5, 2018, the entire contents of which are hereby incorporated by reference.

BACKGROUND

Field

The present disclosure relates to a resin case.

Description of the Background Art

A technique to manufacture a molded product by subjecting a base material composed of a thermoplastic resin containing continuous fibers to press-working and supplementing a portion insufficient for desired size and shape with an injected molten thermoplastic resin has conventionally been disclosed (see, for example, Japanese Patent Laying-Open No. 2014-148124).

SUMMARY

In applying the technique described in the publication above to a molded product complicated in shape with a plurality of projections and recesses, the continuous fibers may be cut or wrinkled. Therefore, the molded product is divided and then bonded, however, strength of the molded product may consequently be lowered.

The present disclosure provides a resin case capable of achieving improved strength.

According to the present disclosure, a resin case including a continuous fiber sheet and a resin member bonded to the continuous fiber sheet is provided. The continuous fiber sheet includes a bottom surface portion which forms a bottom surface of the resin case, an erected wall portion which is erected from the bottom surface portion and forms a peripheral wall of the resin case, and a stepped portion in which the continuous fiber sheet connecting the bottom surface portion and the erected wall portion to each other is bent like steps along the peripheral wall. The resin member includes a rib portion which is bonded to the stepped portion and extends from the stepped portion toward an outer edge of the resin case.

According to such a construction, the rib portion can improve compression strength of the resin case and the stepped portion can improve tensile strength of the resin case. Therefore, strength of the peripheral wall of the resin case can be improved against production of stress in a direction orthogonal to the peripheral wall.

In the resin case, the resin member includes a plurality of rib portions. As the plurality of rib portions receive compressive stress, compression strength of the resin case can further be improved.

The resin case is substantially in a shape of a polygon in a plan view, and the rib portion is provided in a central portion of a side of the polygon. As a result of reinforcement by providing the rib portion in the central portion of the side of the polygon where strength is structurally relatively low in the peripheral wall of the resin case, strength of the peripheral wall of the resin case can effectively be improved.

In the resin case, the rib portion extends substantially orthogonal to the bottom surface. Since the rib portion can receive stress applied to the stepped portion from above, strength of the resin case can further be improved.

In the resin case, the resin member includes a lateral rib portion which is arranged closer to the outer edge of the resin case than the rib portion and extends substantially in parallel to the bottom surface. When stress in a direction orthogonal to the peripheral wall is applied from the outside of the resin case, stress can propagate through the lateral rib portion and can be distributed in a lateral direction and hence occurrence of local concentration of stress can be avoided. Therefore, strength of the resin case can further be improved.

In the resin case, the resin member includes a plurality of lateral rib portions. Stress is distributed through the plurality of lateral rib portions so that strength of the resin case can further be improved.

In the resin case, the lateral rib portion is provided in a central portion of a side of the polygon. As a result of reinforcement by providing the lateral rib portion in the central portion of the side of the polygon where strength is structurally relatively low in the peripheral wall of the resin case, strength of the peripheral wall of the resin case can effectively be improved.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a partial bottom view of the resin case in a direction shown with an arrow III in FIG. 2.

FIG. 4 is a side view of the resin case in a direction shown with an arrow IV in FIG. 1.

DESCRIPTION OF THE PREFERRED EMBODIMENTS

Figure 1:
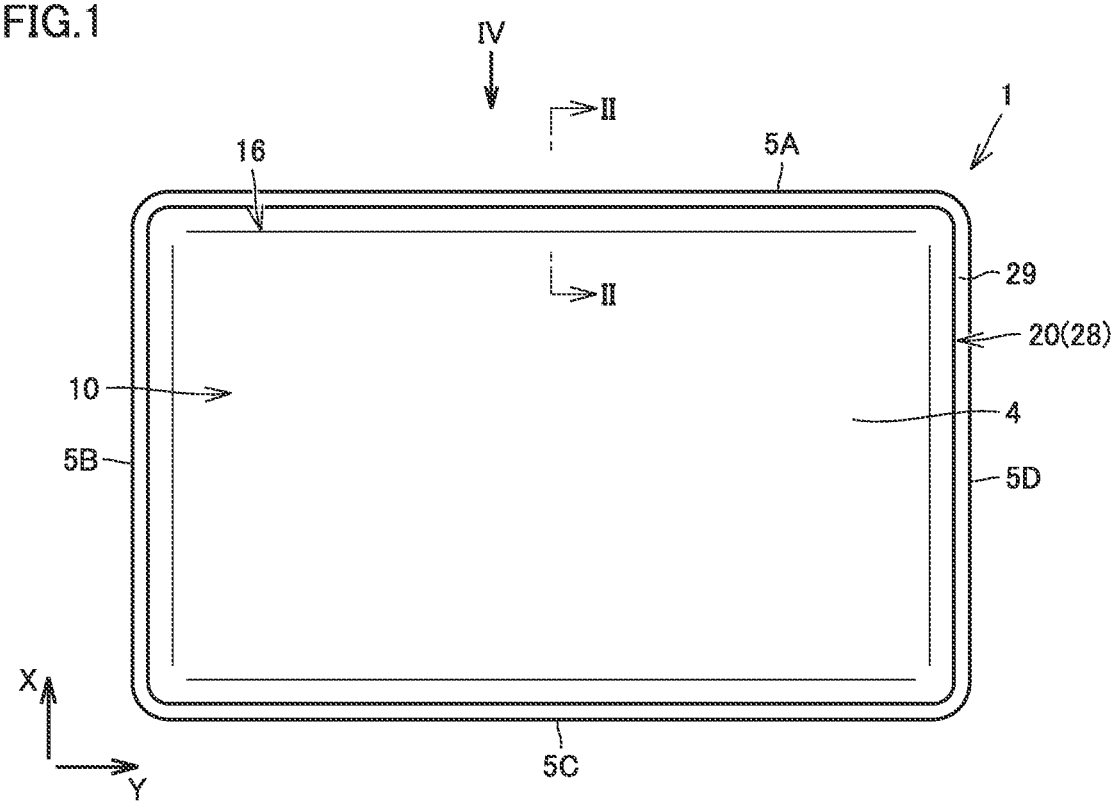
FIG. 1 is a plan view of a resin case according to an embodiment.

A resin case in an embodiment will be described below with reference to the drawings. The same or substantially the same elements in an embodiment shown below have the same reference characters allotted and redundant description will not be repeated.

FIG. 1 is a plan view of a resin case 1 according to an embodiment. Resin case 1 shown in FIG. 1 includes a bottom surface 4 substantially rectangular in a plan view and a peripheral wall which is erected from bottom surface 4 in an edge portion of bottom surface 4. Resin case 1 is substantially oblong in a plan view. Though resin case 1 in the embodiment is two-dimensionally in a polygonal shape gently curved in a corner portion rather than in a shape of an exact polygon, a substantially polygonal shape herein encompasses such a shape. Resin case 1 defines an accommodation space which opens upward, by its bottom surface 4 and four peripheral walls which surround bottom surface 4, and it is configured to be able to accommodate an article in the accommodation space.

Resin case 1 includes outer edges 5A, 5B, 5C, and 5D which form an outer edge portion in a plan view. Outer edges 5A, 5B, 5C, and 5D linearly extend. Outer edge 5A and outer edge 5C extend substantially in parallel to each other. Outer edge 5B and outer edge 5D extend substantially in parallel to each other. Outer edges 5A and 5C extend substantially orthogonal to outer edges 5B and 5D. As shown in FIG. 1, a direction in which outer edges 5B and 5D extend in the plan view of resin case 1 is herein defined as an X direction and a direction in which outer edges 5A and 5C extend is defined as a Y direction. The X direction and the Y direction are orthogonal to each other.

Being substantially in parallel herein encompasses an example in which a plurality of straight lines or planes are exactly in parallel to each other and an example in which an angle formed between a plurality of straight lines or planes is sufficiently small (for example, not greater than 10°), although the straight lines or planes do not extend exactly in parallel to each other. Being substantially orthogonal or substantially perpendicular herein encompasses an example in which a plurality of straight lines or planes form a strictly right angle and encompasses an example in which an angle formed between a plurality of straight lines or planes is sufficiently close to a right angle (for example, not smaller than 80° and not greater than 100°), although the straight lines or planes do not form a strictly right angle.

Resin case 1 includes a continuous fiber sheet 10 and a resin member 20. Bottom surface 4 of resin case 1 is formed by continuous fiber sheet 10. Reduction in weight of resin case 1 is realized by including continuous fiber sheet 10 in resin case 1.

Continuous fiber sheet 10 is a base material in a form of a sheet in which continuous fibers are buried in a thermoplastic resin, and it is referred to as an organosheet. The continuous fibers are, for example, glass fibers. For example, polyamide 6 is employed as the thermoplastic resin. The continuous fibers extend in a plurality of directions in continuous fiber sheet 10. The continuous fibers include at least continuous fibers extending in the X direction and continuous fibers extending in the Y direction. Continuous fiber sheet 10 includes continuous fibers in a mesh in which continuous fibers extending in different directions intersect with (typically are orthogonal to) each other.

Continuous fiber sheet 10 includes a stepped portion 16 where continuous fiber sheet 10 is folded in the vicinity of the peripheral wall of resin case 1. Details of stepped portion 16 will be described later.

Resin member 20 is molded by injection molding and it is high in degree of freedom of a shape. Resin member 20 is bonded to continuous fiber sheet 10 by insert molding, by which continuous fiber sheet 10 and a thermoplastic resin are integrated with each other as a result of injection of the thermoplastic resin into a mold where continuous fiber sheet 10 is arranged in a molding space and curing of the thermoplastic resin. For example, polyamide 6 containing glass fibers is adopted as the thermoplastic resin to be injected. A content of glass fibers is, for example, 30 weight %. Molding by pressing of continuous fiber sheet 10 and injection molding of resin member 20 may simultaneously be performed.

Resin member 20 includes a peripheral wall forming portion 28 which forms the peripheral wall of resin case 1. Peripheral wall forming portion 28 includes an edge portion 29 having an upper end bent outward. An outer peripheral edge of edge portion 29 defines outer edges 5A, 5B, 5C, and 5D of resin case 1.

Figure 2:
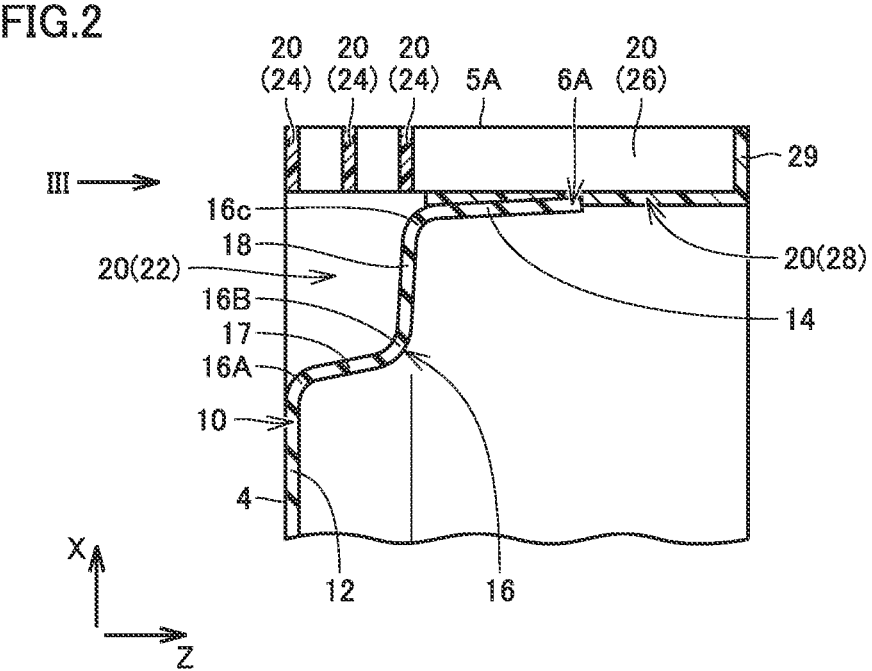
FIG. 2 is a cross-sectional view of the resin case along the line II-II shown in FIG. 1.

FIG. 2 is a cross-sectional view of resin case 1 along the line II-II shown in FIG. 1. A Z direction shown in FIG. 2 is a direction orthogonal to the X direction and the Y direction and it is a direction perpendicular to the sheet plane in FIG. 1. The X direction, the Y direction, and the Z direction define a three-dimensional rectangular coordinate system. Bottom surface 4 of resin case 1 extends along the X direction and the Y direction and is present on an XY plane. A peripheral wall 6A of resin case 1 shown in FIG. 2 is a peripheral wall of a part of the peripheral wall of resin case 1 arranged in the vicinity of outer edge 5A and extends along the Y direction and the Z direction.

As shown in FIG. 2, continuous fiber sheet 10 includes a bottom surface portion 12 which forms bottom surface 4 of resin case 1 and an erected wall portion 14 which forms peripheral wall 6A of resin case 1. Stepped portion 16 connects bottom surface portion 12 and erected wall portion 14 to each other. Stepped portion 16 is provided at a root portion of erected wall portion 14. Stepped portion 16 protrudes into an inner space in resin case 1. Stepped portion 16 is formed as continuous fiber sheet 10 is folded to protrude into the accommodation space in resin case 1.

Stepped portion 16 is formed in a peripheral edge portion of bottom surface portion 12 by folding continuous fiber sheet 10 along a direction in which the peripheral edge portion extends in a plan view (the Y direction in the embodiment shown in FIG. 2). Stepped portion 16 is formed by folding continuous fiber sheet 10 at three positions of folding 16A, 16B, and 16C. Stepped portion 16 is formed by folding continuous fiber sheet 10 at least two times (three times in the embodiment shown in FIG. 2).

At positions of folding 16A, 16B, and 16C shown in FIG. 2, continuous fiber sheet 10 is bent along a direction perpendicular to the sheet plane in FIG. 2, that is, in the Y direction. Stepped portion 16 shown in FIG. 2 is formed by bending continuous fiber sheet 10 like steps along peripheral wall 6A. Stepped portion 16 is formed by bending continuous fiber sheet 10 like a crank. Stepped portion 16 is in a shape like stairs which defines a height difference from bottom surface portion 12.

Stepped portion 16 includes a vertical surface portion 17 and a lateral surface portion 18. Vertical surface portion 17 is formed between position of folding 16A and position of folding 16B. Vertical surface portion 17 is erected substantially perpendicularly from an outer peripheral edge of bottom surface portion 12 which forms bottom surface 4. Lateral surface portion 18 is formed between position of folding 16B and position of folding 16C. Lateral surface portion 18 extends substantially in parallel to bottom surface portion 12 from an upper edge of vertical surface portion 17 toward outer edge 5A of resin case 1. One edge of lateral surface portion 18 leads to an upper edge of vertical surface portion 17 and the other edge of lateral surface portion 18 leads to a lower edge of erected wall portion 14.

Erected wall portion 14 is provided along peripheral wall forming portion 28 which is a partial feature of resin member 20. Erected wall portion 14 and peripheral wall forming portion 28 are integrally bonded to each other. Erected wall portion 14 and peripheral wall forming portion 28 are integrated at the time of insert molding described above.

Resin member 20 includes a rib portion 22. Rib portion 22 is bonded to stepped portion 16 of continuous fiber sheet 10. Stepped portion 16 and rib portion 22 are integrated at the time of insert molding described above.

Rib portion 22 is bonded to vertical surface portion 17 of stepped portion 16 and extends from vertical surface portion 17 toward outer edge 5A of resin case 1. In the X direction, rib portion 22 is arranged between stepped portion 16 and outer edge 5A of resin case 1. Rib portion 22 is bonded to lateral surface portion 18 of stepped portion 16 and extends from lateral surface portion 18 toward bottom surface 4 of resin case 1. In the Z direction, rib portion 22 is arranged between stepped portion 16 and bottom surface 4 of resin case 1.

Rib portion 22 is arranged as being in contact with both of vertical surface portion 17 and lateral surface portion 18 of stepped portion 16 and bonded to both of vertical surface portion 17 and lateral surface portion 18, so that strength of bonding of rib portion 22 to continuous fiber sheet 10 is enhanced. Rib portion 22 is arranged on an inner side of a stepped shape defined by stepped portion 16. When resin case 1 is arranged such that the accommodation space described above opens upward, rib portion 22 is arranged below stepped portion 16 and outside resin case 1.

Rib portion 22 shown in FIG. 2 extends along the X direction and the Z direction. Rib portion 22 is present on an XZ plane. Rib portion 22 extends substantially orthogonal to vertical surface portion 17 of stepped portion 16 and extends substantially orthogonal to lateral surface portion 18. Rib portion 22 extends substantially orthogonal to both of bottom surface portion 12 and erected wall portion 14. Rib portion 22 extends substantially orthogonal to bottom surface 4 and peripheral wall 6A of resin case 1.

Resin member 20 includes a lateral rib portion 24. Lateral rib portion 24 extends along the X direction and the Y direction. Lateral rib portion 24 extends on the XY plane. Lateral rib portion 24 shown in FIG. 2 is in a shape of an elongated flat plate of which longitudinal direction extends in the Y direction. Lateral rib portion 24 extends substantially in parallel to bottom surface 4 of resin case 1. Lateral rib portion 24 extends substantially orthogonal to rib portion 22.

Lateral rib portion 24 is arranged closer to outer edge 5A of resin case 1 than rib portion 22. One of a pair of long sides of lateral rib portion 24 is opposed to rib portion 22 and bonded to and integrated with rib portion 22. The other of the pair of long sides of lateral rib portion 24 faces the outside of resin case 1 and defines outer edge 5A of resin case 1.

Resin case 1 includes a plurality of (three in the embodiment shown in FIG. 2) lateral rib portions 24. The lateral rib portions 24 are arranged in parallel to one another as being aligned in the Z direction at an interval from one another.

Resin member 20 includes a vertical rib portion 26. Vertical rib portion 26 shown in FIG. 2 extends along the X direction and the Z direction. Vertical rib portion 26 shown in FIG. 2 extends on the XZ plane. Vertical rib portion 26 is in a shape of an elongated plate of which longitudinal direction extends in the Z direction. Vertical rib portion 26 extends substantially in parallel to rib portion 22. Vertical rib portion 26 extends substantially orthogonal to peripheral wall forming portion 28. Vertical rib portion 26 extends substantially orthogonal to lateral rib portion 24.

Vertical rib portion 26 is arranged between edge portion 29 of resin member 20 and lateral rib portion 24 located uppermost among the plurality of lateral rib portions 24 (located at a smallest distance from edge portion 29). Vertical rib portion 26 has an upper end bonded to a lower surface of edge portion 29. Vertical rib portion 26 has a lower end bonded to an upper surface of lateral rib portion 24. One of a pair of long sides of vertical rib portion 26 is opposed to peripheral wall forming portion 28 and integrated as being bonded to peripheral wall forming portion 28. The other of the pair of long sides of vertical rib portion 26 faces the outside of resin case 1 and defines outer edge 5A of resin case 1.

FIG. 3 is a partial bottom view of resin case 1 in a direction shown with an arrow III in FIG. 2. FIG. 2 shows a cross-section of resin case 1 in the direction shown with an arrow II in FIG. 3. As shown in FIG. 3, resin member 20 includes a plurality of rib portions 22. Rib portions 22 are arranged in parallel as being aligned in the Y direction at a distance from one another. When resin case 1 is viewed from below, lateral surface portion 18 which defines stepped portion 16 can be seen between adjacent rib portions 22.

FIG. 4 is a side view of resin case 1 in a direction shown with an arrow IV in FIG. 1. FIG. 2 shows a cross-section of resin case 1 along the arrow II-II in FIG. 4. As shown in FIG. 4, rib portion 22, lateral rib portion 24, and vertical rib portion 26 are provided in the central portion of peripheral wall 6A of resin case 1 in the Y direction and they form a highly rigid portion. As shown in FIG. 1, resin case 1 is substantially oblong in a plan view and the highly rigid portion is provided in the central portion of a side of the oblong shape.

In resin case 1 according to the embodiment described above, as shown in FIG. 2, continuous fiber sheet 10 includes stepped portion 16 bent like steps, and resin member 20 includes rib portion 22 which extends from stepped portion 16 toward outer edge 5A of resin case 1. According to such a construction, when stress in a direction orthogonal to peripheral wall 6A (in the X direction in FIG. 2) is applied from the outside of resin case 1 to peripheral wall 6A, the stress propagates sequentially from rib portion 22 to continuous fiber sheet 10. Rib portion 22 improves compression strength of resin case 1 and stepped portion 16 of continuous fiber sheet 10 improves tensile strength of resin case 1. Therefore, strength of peripheral wall 6A of resin case 1 can be improved against production of stress.

As shown in FIGS. 3 and 4, resin member 20 includes a plurality of rib portions 22. As the plurality of rib portions 22 receive compressive stress, compression strength of resin case 1 can further be improved.

As shown in FIG. 1, resin case 1 is substantially in a shape of a quadrangle in a plan view. As shown in FIG. 4, rib portion 22 is provided in a central portion of a side of the quadrangle. As a result of reinforcement of the central portion by providing rib portion 22 in the central portion of the side of the quadrangle where strength is structurally relatively low in peripheral wall 6A of resin case 1, strength of peripheral wall 6A of resin case 1 can effectively be improved.

As shown in FIG. 2, rib portion 22 extends substantially orthogonal to bottom surface 4 of resin case 1. Thus, rib portion 22 receives stress applied to stepped portion 16 from above (along the Z direction in FIG. 2). Since rib portion 22 improves strength of stepped portion 16 in a vertical direction, an article can be supported in a more stable manner when the article is placed on lateral surface portion 18 of stepped portion 16. Therefore, strength of resin case 1 can further be improved.

As shown in FIGS. 2 and 4, resin member 20 further includes lateral rib portion 24. Lateral rib portion 24 is arranged closer to outer edge 5A of resin case 1 than rib portion 22 and extends substantially in parallel to bottom surface 4 of resin case 1. According to such a construction, when stress in a direction orthogonal to peripheral wall 6A (the X direction in FIG. 2) is applied from the outside of resin case 1 to peripheral wall 6A, stress can propagate through lateral rib portion 24 and can be distributed in a lateral direction (the Y direction in the embodiment). Since occurrence of local concentration of stress can be avoided, strength of resin case 1 can further be improved.

As shown in FIG. 2, resin member 20 includes a plurality of lateral rib portions 24. According to such a construction that stress is distributed through the plurality of lateral rib portions 24, strength of resin case 1 can further be improved.

As shown in FIG. 4, lateral rib portion 24 is provided in a central portion of a side of a quadrangle defined by resin case 1 in a plan view. As a result of reinforcement of the central portion by providing lateral rib portion 24 in the central portion of the side of the quadrangle where strength is structurally relatively low in peripheral wall 6A of resin case 1, strength of peripheral wall 6A of resin case 1 can effectively be improved.

In the embodiment above, a technique to improve strength of peripheral wall 6A by providing stepped portion 16, rib portion 22, and lateral rib portion 24 in the vicinity of outer edge 5A of resin case 1 is described. Stepped portion 16, rib portion 22, and lateral rib portion 24 similar to those in the embodiment can be provided also in the vicinity of other outer edges 5B, 5C, and 5D of resin case 1 to form a highly rigid portion so that four peripheral walls of resin case 1 can all be reinforced and further improvement in strength of resin case 1 can be achieved.

An example of presence of one step formed by bending stepped portion 16 at three positions of folding 16A, 16B, and 16C is described in the embodiment. Stepped portion 16 may be formed like stairs including a plurality of steps which alternately include a plurality of lateral surface portions extending substantially in parallel to bottom surface portion 12 and a plurality of vertical surface portions which extend upward as being substantially orthogonal to bottom surface portion 12. By forming stepped portion 16 in a plurality of steps, strength of resin case 1 can further be improved.

Though each rib portion 22 is in a form of a flat plate in the embodiment, rib portion 22 may be in such a shape that a part of the flat plate is cut away so long as it can receive compressive stress between stepped portion 16 and the outer edge of resin case 1.

Bottom surface 4 of resin case 1 is not limited to a substantially rectangular shape but may be in any quadrangular shape, and in addition, it may be in any substantially polygonal shape without being limited to the quadrangular shape. By providing a highly rigid portion including a rib portion and a lateral rib portion similar to those in the embodiment in a central portion of a side of a polygon, an effect to improve strength of resin case 1 can similarly be obtained.

EXAMPLE

An Example will be described below. Resin case 1 constructed as described in the embodiment was made and application and removal of stress to a central portion in the Y direction of peripheral wall 6A was repeated. A maximum load up to which resin case 1 was not damaged was thus evaluated. A resin case including a continuous fiber sheet without a stepped portion in which a bottom surface portion and a peripheral wall forming portion were directly connected to each other without a stepped portion being interposed was similarly evaluated as a first comparative example. A resin case including a continuous fiber sheet which included only a bottom surface portion without including a shape erected from the bottom surface portion was similarly evaluated as a second comparative example.

It was shown that resin case 1 in the Example could exhibit strength sufficient against stress applied from the outside of resin case 1 to the peripheral wall. A maximum load of the resin case in the second comparative example was less than one fifth of that of the Example and a maximum load of the resin case in the first comparative example was less than one third of that of the Example, and both of them were insufficient in maximum load. When a load exceeding the maximum load was applied in resin case 1 to cause deformation of resin case 1 in the Example, bottom surface 4 of resin case 1 was deformed but the highly rigid portion which reinforced the peripheral wall was not damaged.

Therefore, it was shown that strength of resin case 1 could sufficiently be enhanced and an article accommodated in resin case 1 could properly be protected by including stepped portion 16 and rib portion 22 in resin case 1.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A resin case comprising:
   a continuous fiber sheet; and
   a resin member bonded to the continuous fiber sheet,
   the continuous fiber sheet including
      a bottom surface portion which forms a bottom surface of the resin case,
      an erected wall portion which is erected from the bottom surface portion and forms a peripheral wall of the resin case, and
      a stepped portion in which the continuous fiber sheet connecting the bottom surface portion and the erected wall portion to each other is bent like steps along the peripheral wall,
   the resin member including
      a rib portion which is bonded to the stepped portion and extends from the stepped portion toward an outer edge of the resin case and extends substantially orthogonal to the bottom surface, and
      a lateral rib portion which is arranged closer to the outer edge of the resin case than the rib portion and extends substantially in parallel to the bottom surface.

2. The resin case according to claim 1, wherein the resin member includes a plurality of rib portions.

3. The resin case according to claim 1, the resin case being substantially in a shape of a polygon in a plan view, wherein the rib portion is provided in a central portion of a side of the polygon.

4. The resin case according to claim 1, wherein the resin member includes a plurality of lateral rib portions.

5. The resin case according to claim 1, the resin case being substantially in a shape of a polygon in a plan view, wherein the lateral rib portion is provided in a central portion of a side of the polygon.

6. The resin case according to claim 4, the resin case being substantially in a shape of a polygon in a plan view, and wherein the lateral rib portion is provided in a central portion of a side of the polygon.

7. The resin case according to claim 2, the resin case being substantially in a shape of a polygon in a plan view, wherein the rib portion is provided in a central portion of a side of the polygon.

* * * * *